United States Patent
Koster et al.

(10) Patent No.: US 11,102,258 B2
(45) Date of Patent: Aug. 24, 2021

(54) STREAM PROCESSING WITHOUT CENTRAL TRANSPORTATION PLANNING

(71) Applicant: International Business Machines Corporation, Armonk, NY (US)

(72) Inventors: David M. Koster, Rochester, MN (US); Warren Patrick Acker, Oronoco, MN (US); Schuman Shao, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/031,818

(22) Filed: Jul. 10, 2018

(65) Prior Publication Data
US 2020/0021631 A1    Jan. 16, 2020

(51) Int. Cl.
*H04L 29/06* (2006.01)
*H04L 5/00* (2006.01)
*H04L 1/22* (2006.01)

(52) U.S. Cl.
CPC ........... *H04L 65/4076* (2013.01); *H04L 1/22* (2013.01); *H04L 5/0037* (2013.01); *H04L 5/0064* (2013.01); *H04L 5/0067* (2013.01)

(58) Field of Classification Search
CPC .. H04L 65/4076; H04L 5/0067; G06F 9/5061
USPC .............................................. 709/231, 224
See application file for complete search history.

(56) References Cited

U.S. PATENT DOCUMENTS

| 8,898,505 B2 * | 11/2014 | Fawcett | G06F 9/5061 |
| | | | 709/224 |
| 9,559,896 B2 | 1/2017 | Patwardhan et al. | |
| 9,569,178 B1 * | 2/2017 | Barsness | G06F 8/20 |
| 9,582,250 B1 | 2/2017 | Barsness | |
| 9,652,295 B2 | 5/2017 | Barsness | |
| 9,946,631 B1 * | 4/2018 | Cook | G06F 16/24568 |
| 9,971,633 B1 * | 5/2018 | Barsness | G06F 8/433 |
| 9,971,810 B2 | 5/2018 | Branson | |
| 10,009,251 B1 * | 6/2018 | Koster | H04L 43/0817 |

(Continued)

OTHER PUBLICATIONS

Mahalingam et al. "RFC 7348—Virtual eXtensible Local Area Network (VXLAN)", Aug. 2014, https://tools.ietf.org/html/rfc7348, entire document.*

(Continued)

*Primary Examiner* — Douglas B Blair
(74) *Attorney, Agent, or Firm* — Steven M. Bouknight

(57) ABSTRACT

In using a virtual extensible local area network (VXLAN) for stream processing, a management system allocates resources for a streaming application based on an operator graph of the streaming application. The management system assigns the resources to a group of VXLAN segments based on the operator graph of the streaming application. A first processing element of the streaming application multicasts data on the group of VXLAN segments. A second processing element on a given VXLAN segment of the group of VXLAN segments receives the data. If the second processing element is an intended recipient of the data, then the second processing element processes the data. If the second processing element is not the intended recipient of the data, then the second processing element ignores the data.

12 Claims, 7 Drawing Sheets

(56) References Cited

U.S. PATENT DOCUMENTS

| | | | | |
|---|---|---|---|---|
| 10,812,406 | B2* | 10/2020 | Santosuosso | H04L 47/70 |
| 2012/0137178 | A1* | 5/2012 | Barsness | G06F 11/362 |
| | | | | 714/35 |
| 2012/0179809 | A1* | 7/2012 | Barsness | H04L 29/06 |
| | | | | 709/224 |
| 2015/0124828 | A1* | 5/2015 | Cj | H04L 12/4633 |
| | | | | 370/392 |
| 2015/0128135 | A1* | 5/2015 | Cao | G06F 16/9024 |
| | | | | 718/1 |
| 2015/0154055 | A1* | 6/2015 | Branson | G06F 9/5061 |
| | | | | 718/104 |
| 2015/0254094 | A1* | 9/2015 | Cao | G06F 9/5077 |
| | | | | 718/1 |
| 2017/0063724 | A1* | 3/2017 | Cao | G06F 16/24568 |
| 2017/0091305 | A1* | 3/2017 | Cao | G06F 16/285 |
| 2017/0300367 | A1 | 10/2017 | Zhang et al. | |
| 2017/0331641 | A1 | 11/2017 | Fu | |
| 2018/0332012 | A1* | 11/2018 | Koster | H04L 9/0894 |
| 2019/0140969 | A1* | 5/2019 | Santosuosso | H04L 67/10 |

OTHER PUBLICATIONS

"Configure VXLAN", https://www.cisco.com/c/en/us/support/docs/switches/nexus-9000-series-switches/118978-config-vxlan-00.html#anc6, Oct. 2016.

"Multicast", Wikipedia, https://en.wikipedia.org/wiki/Multicast, May 2018.

"Paxos (computer science", Wikipedia, https://en.wikipedia.org/wiki/Paxos_(computer_science), Jun. 2018.

"QUIC, a multiplexed stream transport over UDP", https://www.chromium.org/quic [retrieved Jun. 12, 2018].

"Transmission Control Protocol", Wikipedia, https://en.wikipedia.org/wiki/Transmission_Control_Protocol, May 2018.

"Virtual Extensible LAN", Wikipedia, Oct. 2017 [retrieved Feb. 2018].

Langley, Adam et. al., "The QUIC Transport Protocol: Design and Internet-Scale Deployment," SIGCOMM '17 Proceedings of the Conference of the ACM Special Interest Group on Data Communication, 2017, pp. 183-196.

Nakagawa, Yukihiro et. al., "A management method of IP multicast in overlay networks using openflow," HotSDN '12 Proceedings of the first workshop on Hot topics in software defined networks, 2012, pp. 91-96.

Pech, Andre, "Running OpenStack over a VXLAN Fabric", https://www.openstack.org/assets/presentation-media/OpenStackOverVxlan.pdf, [retrieved Jun. 18, 2018].

Tripathi, Sunay et. al., "Distributed Control Plane for High Performance Switch-based VXLAN Overlays," ANCS '15 Proceedings of the Eleventh ACM/IEEE Symposium on Architectures for networking and communications systems, 2015, pp. 185-186.

\* cited by examiner

STREAM PROCESSING WITHOUT CENTRAL TRANSPORTATION PLANNING

BACKGROUND

Streaming applications are known in the art, and typically include multiple operators, or software analytic modules, coupled together in an operator graph that process data in near real-time. The operators, grouped into processing units, are placed across multiple hosts, or nodes, in a distributed or cloud computing environment. Currently, streaming applications rely on transmission control protocol (TCP) connections to move data between processing elements. However, TCP connections have certain drawbacks. If one of the many processing elements die, then often the data this processing element was processing is lost. Data may also be lost if a TCP connection breaks, and the TCP connection will then have to be rebuilt before data can continue to be processed. Further, TCP requires a centralized transportation manager to manage the TCP connections for the streaming applications, which can be a bottleneck in the speed at which broken TCP connections can be rebuilt.

SUMMARY

Disclosed herein is a method for stream processing using VXLAN, and a computer program product and system as specified in the independent claims. Embodiments of the present invention are given in the dependent claims. Embodiments of the present invention can be freely combined with each other if they are not mutually exclusive.

According to an embodiment of the present invention, a management system allocates resources for a streaming application based on an operator graph of the streaming application. The management system assigns the resources to a group of VXLAN segments based on the operator graph of the streaming application. A first processing element of the streaming application multicasts data on the group of VXLAN segments. A second processing element on a given VXLAN segment of the group of VXLAN segments receives the data. If the second processing element is an intended recipient of the data, then the second processing element processes the data. If the second processing element is not the intended recipient of the data, then the second processing element ignores the data.

DETAILED DESCRIPTION

Figure 1:
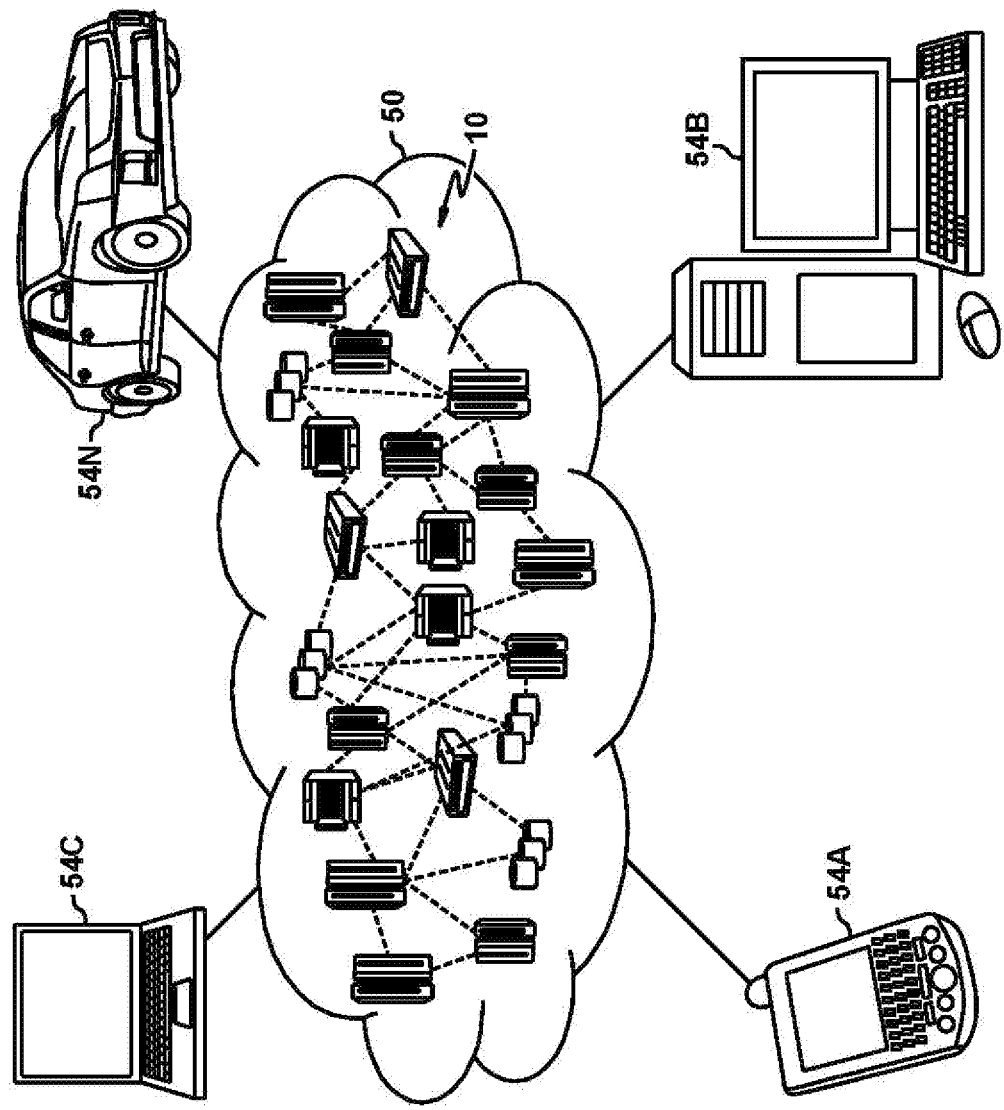
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
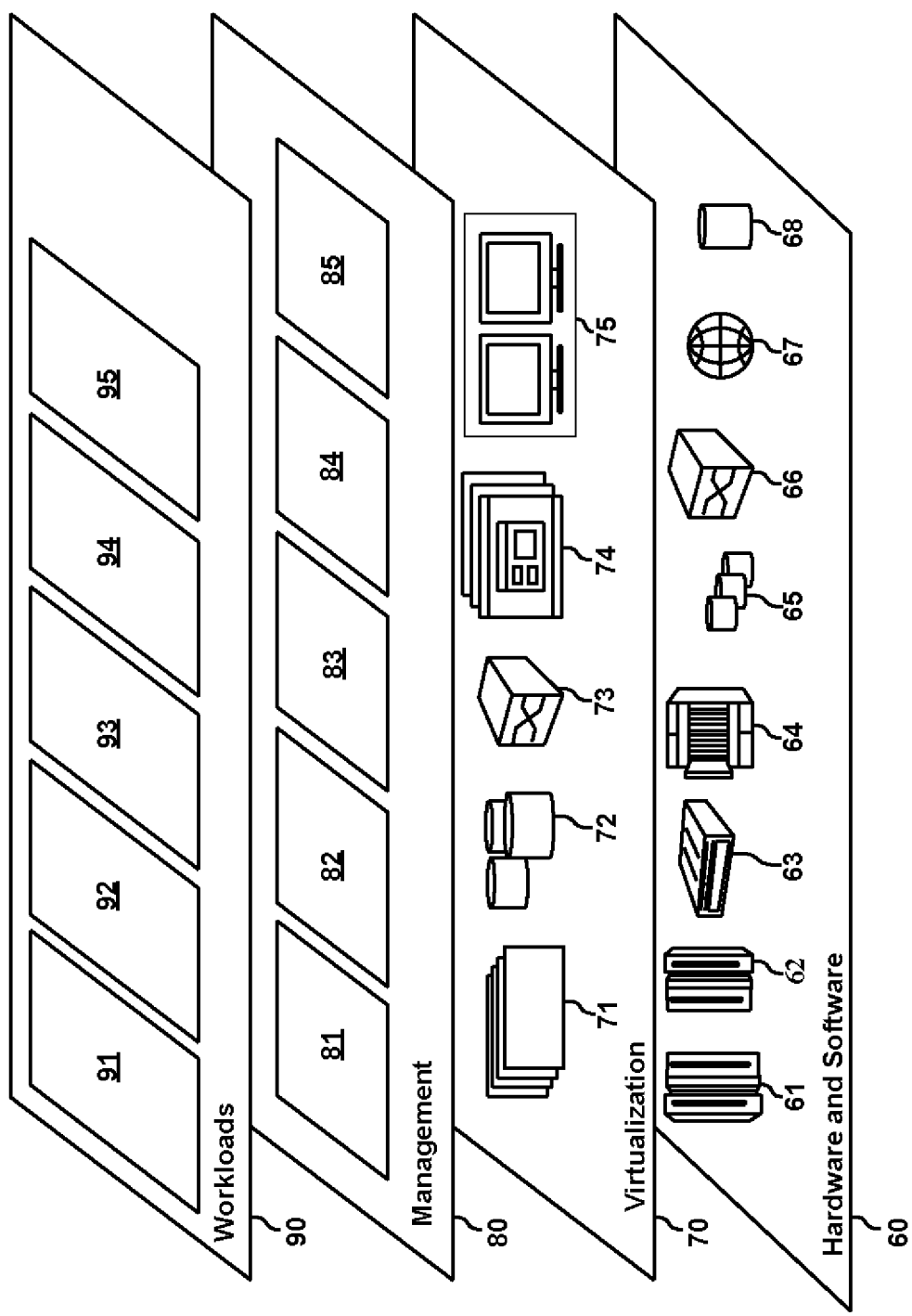
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
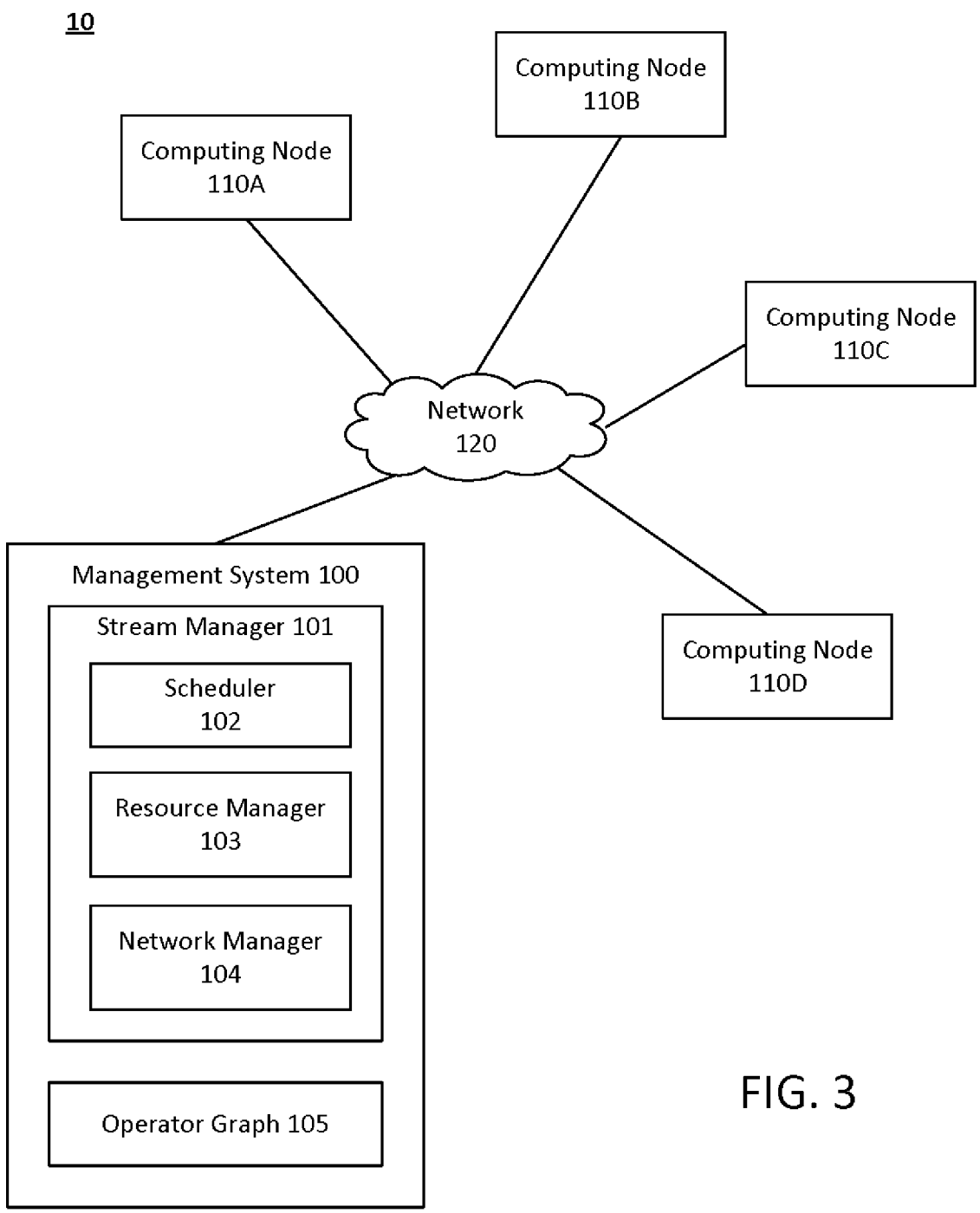
FIG. 3 illustrates an exemplary stream computing environment, according to some embodiments, configured to execute a streaming application.

FIG. 3 illustrates an exemplary stream computing environment, according to some embodiments, configured to execute a streaming application. The stream computing environment 10 includes a management system 100, which includes a stream manager 101, which includes a scheduler 102, a resource manager 103, and a network manager 104. The stream computing environment 10 further includes a plurality of computing nodes, or hosts, 110A-110D. The management system 100 and the plurality of computing nodes 110A-110D communicate over a communications network 120. The communications network 120 may include one or more servers, networks, or databases, and may use a particular communication protocol to transfer data between the computing nodes 110A-110D. Referring to FIGS. 2 and 3, the management system 100 may be implemented in the virtualization layer 70 and the management layer 80. More specifically, the provisioning of networks specifically to meet the needs for the streaming application may be implemented in the virtualization layer 70, which sends resource requests to the management layer 80. Customers of the stream computing service write streaming applications by defining an operator graph 105, which is compiled and submitted to the management system 100. The scheduler 102 of the stream manager 101 places the operators in the operator graph 105 on one or more computing nodes 110A-110D.

Figure 4:
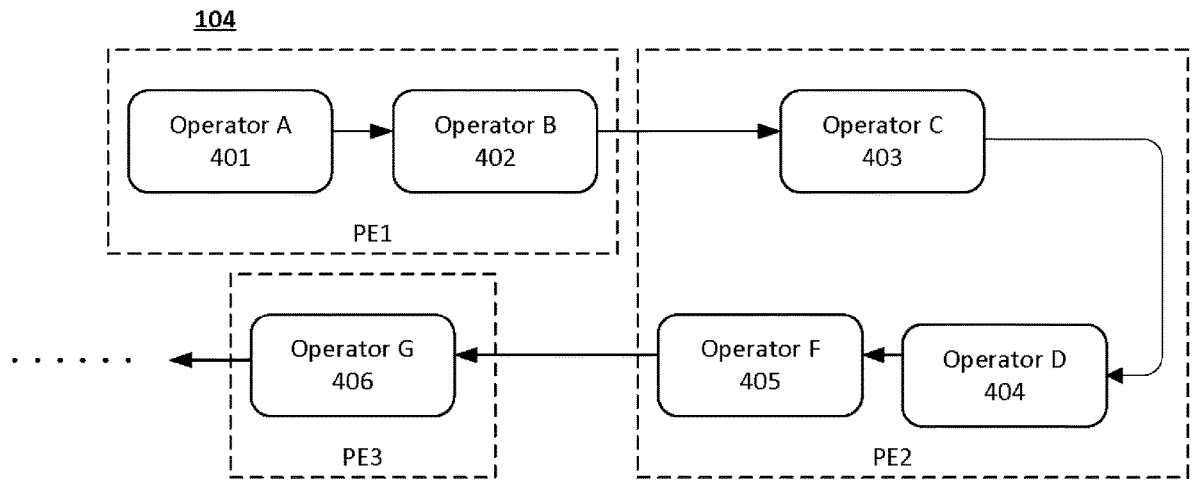
FIG. 4 illustrates a simple example of the operator graph according to some embodiments.
Figure 5:
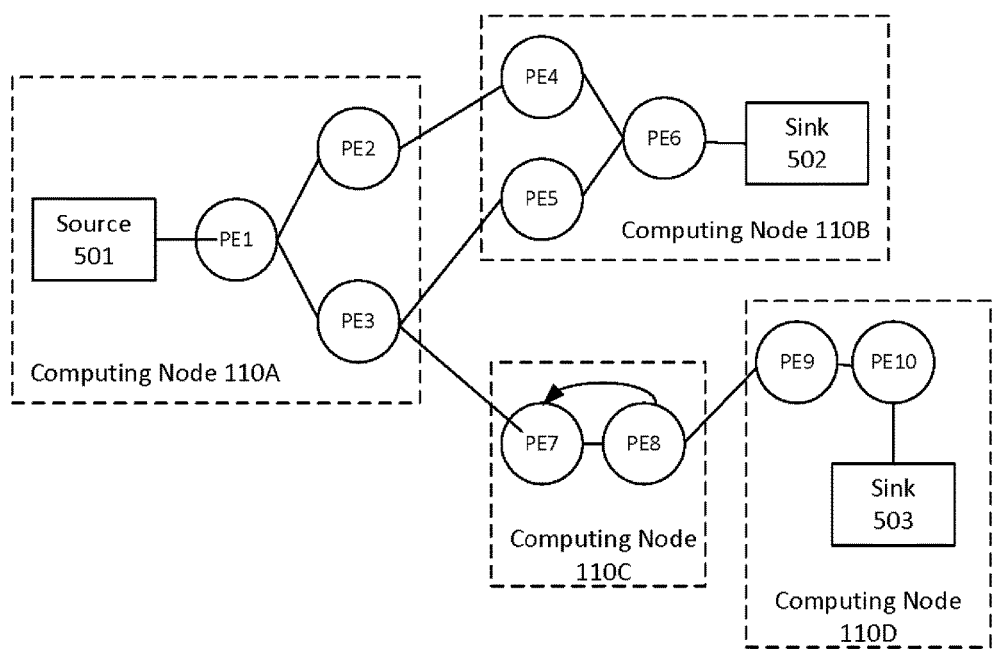
FIG. 5 illustrates an example configuration of processing elements according to some embodiments.

FIG. 4 illustrates a simple example of the operator graph 104 according to some embodiments. The example operator graph 105 includes six operators A-G (401-404). Each operator 401-404 receives data, referred to as "tuples", and applies analytic logic to the tuples. The operator may change the tuple by adding or subtracting attributes or updating the values of existing attributes within the tuple. When the analytic logic is complete, a new tuple is sent to the next operator. When the operator graph 104 of a streaming application is submitted to the stream manager 101, the scheduler 102 places the operators on computing nodes 110A-110D. The scheduler 102 may combine, or "fuse", multiple operators together to form a processing element (PE). As illustrated in FIG. 4, operators A and B (401-402) are fused into processing element PE1, operators C, D, and F (403-405) are fused into processing element PE2, and operator G (406) is alone in processing element PE3. To achieve scalability and performance, the scheduler 102 may distribute the processing elements, PE1-PE3, across multiple computing nodes 110A-110D. As illustrated in FIG. 5, the streaming application begins from a source 501 and ends at one or more sinks 502-503. Computing node 110A includes processing elements PE1, PE2, and PE3. Tuples from the source 501 flows into the processing element PE1 and are processed by the operators 401-402 contained in processing element PE1. The tuples are output by processing element PE1 to processing elements PE2 and PE3. Tuples output by processing element PE2 flow to processing element PE4 on computing node 110B, and tuples output by processing element PE3 flow to processing element PE5 on computing node 110B and processing element PE7 on computing node 110C. Tuples output by processing elements PE4 and PE5 flow to operators in a sink PE6. Similarly, tuples flow from processing element PE7 to processing element PE8 on computing node 110C. Tuples output from processing element PE8 flow to processing element PE9 on computing node 110D, which in turn outputs tuples to be processed by operators in a sink processing element, for example PE10.

Embodiments of the present invention deploys the operators and processing elements of a streaming application using Virtual Extensible Local Area Network (Virtual Extensible LAN or VXLAN) segments instead of TCP connections. VXLAN is a protocol for running an overlay network on existing Layer 3 infrastructure. An overlay network is a virtual network that is built on top of existing network Layer 2 and Layer 3 technologies to support elastic computer architectures. VXLAN allows greater scalability in a cloud computing environment while logically isolating streaming applications and tenants in the cloud computing environment.

Figure 6:
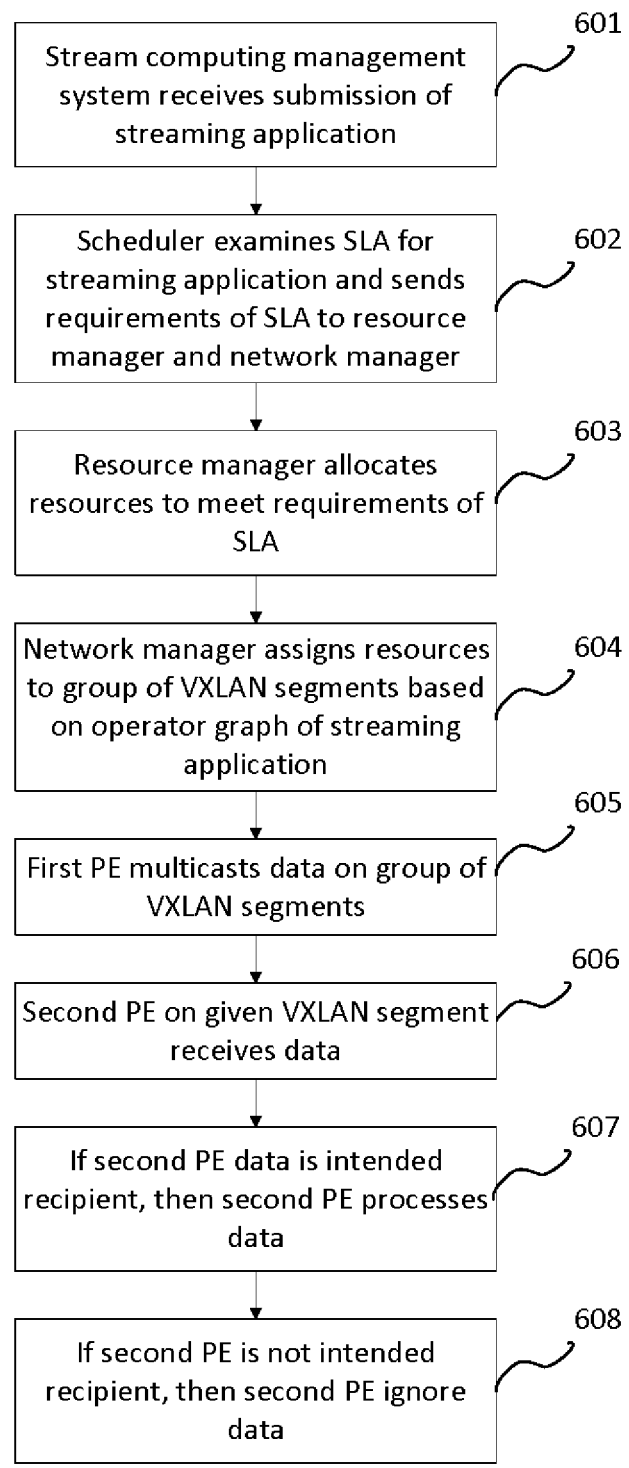
FIG. 6 illustrates a method for stream processing using VXLAN according to some embodiments.

FIG. 6 illustrates a method for stream processing using VXLAN according to some embodiments. First, the stream computing management system 100 receives a submission of a streaming application, including its operator graph 105 (601). The scheduler 102 then examines the SLA for the streaming application and sends the requirements of the SLA to the resource manager 103 and the network manager 104 (602). The resource manager 103 allocates the resources to meet the requirements of the SLA (603). In some embodiments, the allocation of resources by the resource manager 103 is based on a historical analysis of the streaming application or similar data processing patterns, stored in a pattern database (not shown). Based on the historical analysis, n number of resources are provisioned to an VXLAN segment. For example, for a PE-to-PE communication that has not been historically stable, the resource manager 103 allocates additional resources to the VXLAN segment between these PE's. In some embodiments, when the historical analysis finds no matching history, the resource manager 103 retrieves data from the pattern database and searches for similar data processing patterns with associated values, such as the number of resources used on the VXLAN segment. The resource manager 103 then allocates the resources based on the values associated with this pattern.

The network manager 104 assigns the resources allocated by the resource manager 103 to a group of VXLAN segments based on the operator graph 105 of the streaming application (604). The VXLAN segment is based on which PE's exchange data per the operator graph 105. For example, referring to FIG. 5, PE1 and PE2 would be on VXLAN segment 1, PE1 and PE3 would be on VXLAN segment 2, PE2 and PE4 would be on VXLAN segment 3, PE3 and PE5 would be on VXLAN segment 4, PE3 and PE7 would be on VXLAN segment 5, etc. Each VXLAN segment is assigned a unique segment identifier.

Once the resources are placed in the group of VXLAN segments by the resource manager 103 and the network manager 104, a first PE multicasts data on the group of VXLAN segments (605). All of the PE's on each VXLAN segment in the group receives the data. A second PE on a given VXLAN of the group of VXLAN segments receives the data (606). If a second PE is the intended recipient (by, for example, examining the recipient address in the data header), then the second PE processes the data (607). If the second PE is not intended recipient, then the second PE ignores the data (608). In some embodiments, whether a data has been properly received by operators is determined using a consensus protocol, such as Paxos.

Figure 7:
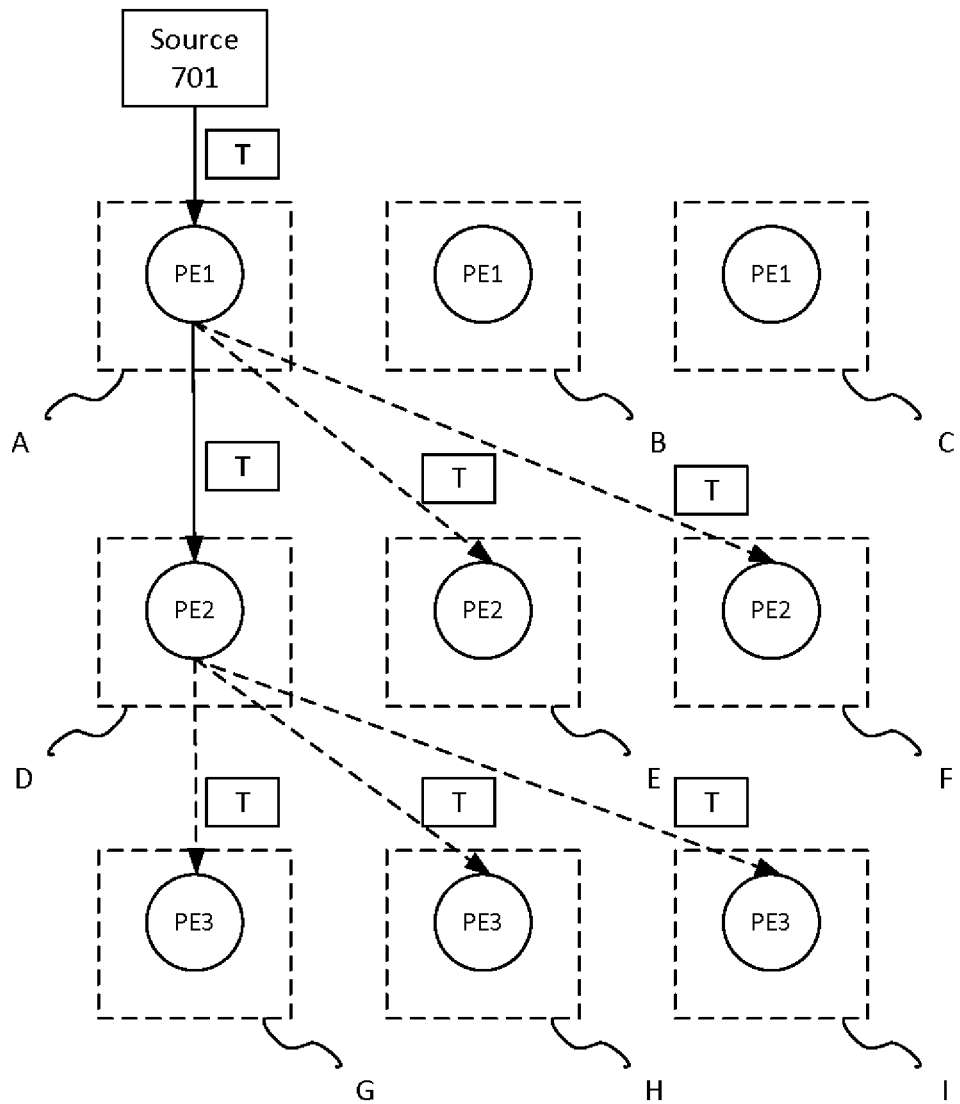
FIG. 7 illustrates an example of stream processing using VXLAN according to some embodiments.

For example, as illustrated in FIG. 7, assume that PE1 is on computing nodes A, B, and C. PE2 is on computing nodes D, E, and F. PE3 is on computing nodes G, H, and I. Assume also that the operator graph 105 for the streaming application indicates that a tuple is to stream from PE1 to PE2 to PE3. In some embodiments, PE1 on computing node A receives the tuple T. PE1 then broadcasts the tuple T to PE2. Assume that PE2 on computing node D receives the tuple T first, and PE2 on computing nodes E and F also receive the tuple T. Using a consensus algorithm, when a configured minimum number of computing nodes D, E, and F agree that the tuple T has been received, the tuple T can be multicast to the next PE in the operator graph, in this case PE3. Based on a combination of factors, such as node workload, current network latency, and performance characteristics, the optimal computing node is selected by consensus. Assume in this example, that the computing node D is selected as the optimal computing node. Computing node D then broadcasts the tuple T to PE3 at computing nodes G, H, and I.

In the case where multiple PEs reside on the computing node, for example, when PE1 and PE2 both reside on computing node A, both PE1 and PE2 receives the tuple T. The metadata for tuple T includes the PE source and the PE destination. PE1 and PE2 each reads the metadata for tuple T. PE1 determines that it is the intended recipient and proceeds to process the tuple. PE2 determines that it is not the intended recipient and ignores or drops the tuple.

Optionally, when selecting the optimal computing node, historical reliability measures could also be used as a factor. If absolute data delivery guarantee is required, a send back mechanism can be implemented, where the optimal computing node selected by consensus broadcasts back to the sender PE a confirmation of receipt of the tuple. A checksum or other calculated value can also be used for further guarantee. If the sender PE does not receive the confirmation within a configured timeout period, then the sender PE can rebroadcast the tuple.

In building VXLAN segments between the PE's of the streaming application, no transportation manager component is required since no management of TCP connections is required.

In some embodiments, in a host failover scenario, an active host and one or more backup hosts are placed on the same VXLAN segment. The segment identifier for the VXLAN segment is compiled as part of streaming application code. When data is multicast on the group of VXLAN segments, per block 605, the data is received by the active host and each backup host. If the active host fails, one of the backup hosts is selected to replace the failed host. The selected backup host is then added to the VXLAN segment associated with the segment identifier as the active host. Since the backup host had already been receiving the multicast data, the backup host can begin functioning as soon as it is designated the active host, without the delay otherwise associated with the reestablishment of TCP connections. This provides performance improvements in the failover scenario.

In some embodiments, in a PE failover scenario, when a PE of the streaming application on one of the VXLAN segments fails, the resource manager 103 allocates a replacement PE, and the network manager 104 "swaps" the failed PE and the replacement PE by assigning the replacement PE to the VXLAN segment, without the delay associated with reestablishment of TCP connections experienced under conventional configurations.

In some embodiments, the resource manager 103 and the network manager 104 may allocate and assign new resources to a VXLAN segment, depending on the processing needs of the streaming application, without needing to establish TCP connections. For example, when the streaming application experiences a data surge, and additional processing capacity of an operator of a certain type is required, one or more new operators of the same type may be allocated and assigned to the same VXLAN segment, without the need to establish new TCP connections. Similarly, when processing capacity exceeds the needs of the streaming application, resources may be removed from a VXLAN segment without the need to remove TCP connections. In this manner, requirements of a SLA may be met with reduced overhead.

The VXLAN can be used to create isolation networks for a streaming application by assigning the VXLAN segments between the streaming application operators and PE's to the same unique network identifier. Data send on the VXLAN segments are encapsulated with the unique network identifier and routed accordingly. In some embodiments, when all entities in this isolated network is known, some security verification mechanisms can be avoided, which improves the speed performance of the network.

Figure 8:
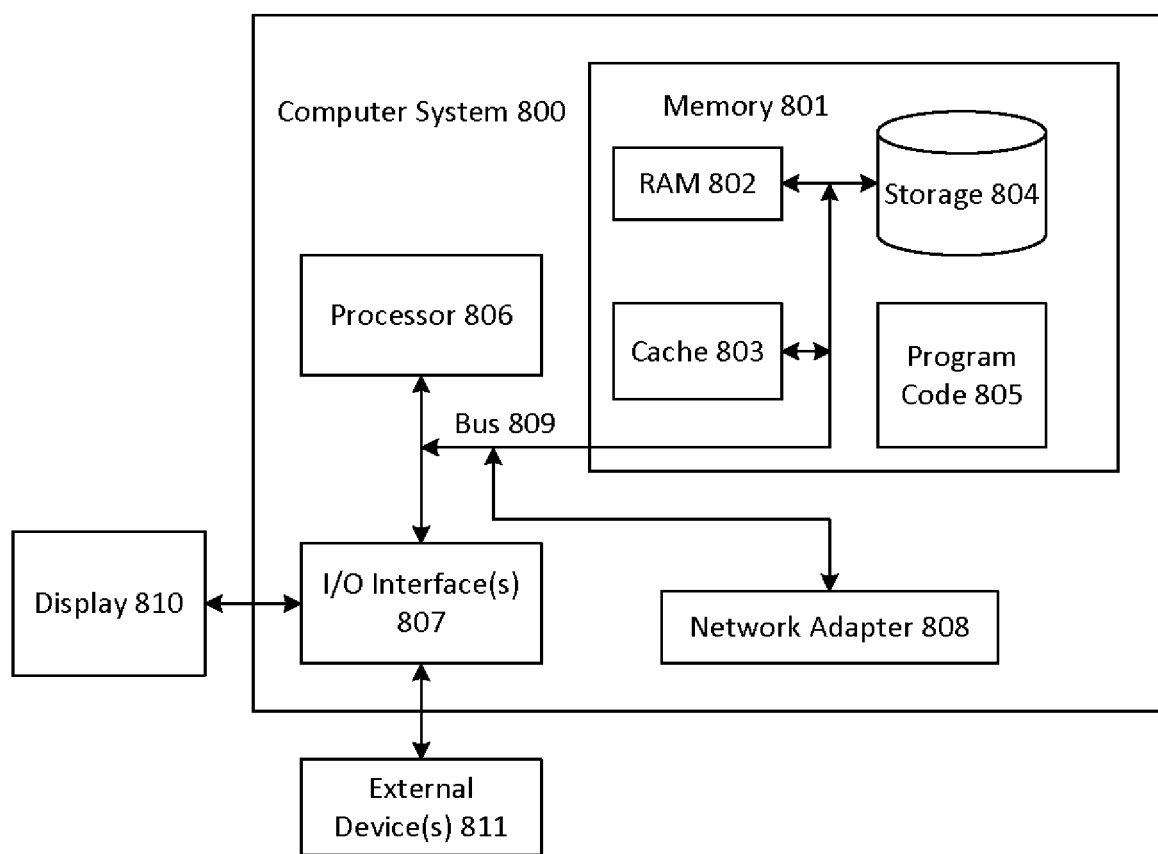
FIG. 8 illustrates a computer system, one or more of which implements the stream runtime environment, according to embodiments of the present invention.

FIG. 8 illustrates a computer system, one or more of which implements the stream runtime environment 10, according to embodiments of the present invention. The computer system 800 is operationally coupled to a processor or processing units 806, a memory 801, and a bus 809 that couples various system components, including the memory 801 to the processor 806. The bus 809 represents one or more of any of several types of bus structure, including a memory bus or memory controller, a peripheral bus, an accelerated graphics port, and a processor or local bus using any of a variety of bus architectures. The memory 801 may include computer readable media in the form of volatile memory, such as random access memory (RAM) 802 or cache memory 803, or non-volatile storage media 804. The memory 801 may include at least one program product having a set of at least one program code module 805 that are configured to carry out the functions of embodiment of the present invention when executed by the processor 806. The computer system 800 may also communicate with one or more external devices 811, such as a display 810, via I/O interfaces 807. The computer system 800 may communicate with one or more networks via network adapter 808.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for stream processing using a virtual extensible local area network (VXLAN), comprising:
receiving, by a management system, an operator graph of a streaming application, the operator graph comprising a plurality of processing elements, wherein each processing element comprises one or more operators of a plurality of operators;
using, by the management system, a group of VXLAN segments between the plurality of processing elements without transmission control protocol (TCP) connections, wherein a VXLAN segment of the group of VXLAN segments is used between each pair of processing elements of the plurality of processing elements to exchange data based on the operator graph;
receiving input data by a first processing element of the plurality of processing elements;
processing the input data by one or more operators of the streaming application in the first processing element;
multicasting output data, by the first processing element, to each of the VXLAN segments of the group of VXLAN segments, wherein each of the other processing elements of the plurality of processing elements receive the output data;
receiving the output data from the first processing element by a second processing element on a given VXLAN segment of the group of VXLAN segments;
in response to receiving the output data from the first processing element, determining, by the second processing element, whether the second processing element is an intended recipient of the output data;
if the second processing element is an intended recipient of the output data, processing the output data by one or more operators of the streaming application in the second processing element; and
if the second processing element is not the intended recipient of the output data, ignoring the output data by the second processing element.

2. The method of claim 1, further comprising:
assigning, by the management system, an active host and one or more backup hosts to a second given VXLAN segment of the group of VXLAN segments, wherein the active host and the one or more backup hosts receive multicasted output data from the first processing element;
determining, by the management system, that the active host has failed;
in response, selecting, by the management system, a given backup host of the one or more backup hosts to replace the failed active host; and
adding, by the management system, the given backup host to the second given VXLAN segment as a replacement active host without reestablishment of TCP connections.

3. The method of claim 1, further comprising:
- determining, by the management system, that a given processing element on a second given VXLAN segment of the group of VXLAN segments has failed;
- in response, allocating, by the management system, a replacement processing element; and
- assigning, by the management system, the replacement processing element on the second given VXLAN segment without reestablishment of TCP connections.

4. The method of claim 1, further comprising:
- determining, by the management system, that additional processing capacity of a given operator of the plurality of operators is required, the given operator having a type and assigned to a second given VXLAN segment of the group of VXLAN segments;
- allocating, by the management system, one or more new operators of the same type; and
- assigning, by the management system, the one or more new operators on the second given VXLAN segment without establishing of new TCP connections.

5. A computer program product for stream processing using a virtual extensible local area network (VXLAN), the computer program product comprising a computer readable storage medium having program instructions embodied therewith to:
- receive an operator graph of a streaming application, the operator graph comprising a plurality of processing elements, wherein each processing element comprises one or more operators of a plurality of operators;
- use a group of VXLAN segments between the plurality of processing elements without transmission control protocol (TCP) connections, wherein a VXLAN segment of the group of VXLAN segments is used between each pair of processing elements of the plurality of processing elements to exchange data based on the operator graph;
- receive input data by a first processing element of the plurality of processing elements;
- process the input data by one or more operators of the streaming application in the first processing element;
- multicast output data, by the first processing element, to each of the VXLAN segments of the group of VXLAN segments, wherein each of the other processing elements of the plurality of processing elements receive the output data;
- receive the output data from the first processing element by a second processing element on a given VXLAN segment of the group of VXLAN segments;
- in response to receiving the output data from the first processing element, determine, by the second processing element, whether the second processing element is an intended recipient of the output data;
- if the second processing element is an intended recipient of the output data, process the output data by one or more operators of the streaming application in the second processing element; and
- if the second processing element is not the intended recipient of the output data, ignore the output data by the second processing element.

6. The computer program product of claim 5, further comprising:
- assign an active host and one or more backup hosts to a second given VXLAN segment of the group of VXLAN segments, wherein the active host and the one or more backup hosts receive the multicasted output data from the first processing element;
- determine that the active host has failed;
- in response, select a given backup host of the one or more backup hosts to replace the failed active host; and
- add the given backup host to the second given VXLAN segment as a replacement active host without reestablishment of TCP connections.

7. The computer program product of claim 5, further comprising:
- determine that a given processing element on a second given VXLAN segment of the group of VXLAN segments has failed;
- in response, allocate a replacement processing element; and
- assign the replacement processing element to the second given VXLAN segment without reestablishment of TCP connections.

8. The computer program product of claim 5, further comprising:
- determine that additional processing capacity of a given operator of the plurality of operators is required, the given operator having a type and assigned to a second given VXLAN segment of the group of VXLAN segments;
- allocate one or more new operators of the same type; and
- assign the one or more new operators on the second given VXLAN segment without establishing new TCP connections.

9. A system comprising:
- a processor; and
- a computer readable storage medium having program instructions embodied therewith for stream processing using a virtual extensible local area network (VXLAN), wherein the program instructions are executable to:
- receive an operator graph of a streaming application, the operator graph comprising a plurality of processing elements, wherein each processing element comprises one or more operators of a plurality of operators;
- use a group of VXLAN segments between the plurality of processing elements without transmission control protocol (TCP) connections, wherein a VXLAN segment of the group of VXLAN segments is used between each pair of processing elements of the plurality of processing elements to exchange data based on the operator graph;
- receive input data by a first processing element of the plurality of processing elements;
- process the input data by one or more operators of the streaming application in the first processing element;
- multicast output data, by the first processing element, to each of the VXLAN segments of the group of VXLAN segments, wherein each of the other processing elements of the plurality of processing elements receive the output data;
- receive the output data from the first processing element by a second processing element on a given VXLAN segment of the group of VXLAN segments;
- in response to receiving the output data from the first processing element, determine, by the second processing element, whether the second processing element is an intended recipient of the output data;
- if the second processing element is an intended recipient of the output data, process the output data by one or more operators of the streaming application in the second processing element; and
- if the second processing element is not the intended recipient of the output data, ignore the output data by the second processing element.

10. The system of claim 9, further comprising:
assign an active host and one or more backup hosts to a second given VXLAN segment of the group of VXLAN segments, wherein the active host and the one or more backup hosts receive the multicasted output data from the first processing element;
determine that the active host has failed;
in response, select a given backup host of the one or more backup hosts to replace the failed active host; and
add the given backup host to the second given VXLAN segment as a replacement active host without reestablishment of TCP connections.

11. The system of claim 9, further comprising:
determine that a given processing element on a second given VXLAN segment of the group of VXLAN segments has failed;
in response, allocate a replacement processing element; and
assign the replacement processing element on the second given VXLAN segment without reestablishment of TCP connections.

12. The system of claim 9, further comprising:
determine that additional processing capacity of a given operator of the plurality of operators is required, the given operator having a type and assigned to a second given VXLAN segment of the group of VXLAN segments;
allocate one or more new operators of the same type; and
assign the one or more new operators on the second given VXLAN segment without establishing new TCP connections.

* * * * *